Feb. 16, 1926.
J. M. OSGIAN
AUTOMOBILE SIGNAL
Filed April 13, 1925
1,573,501
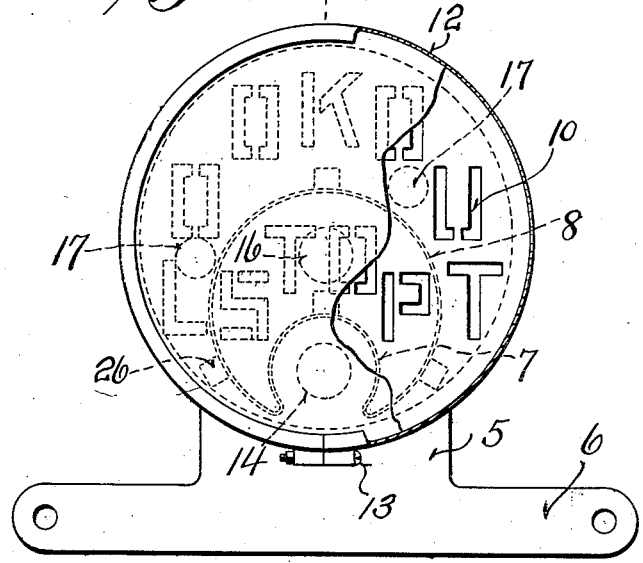
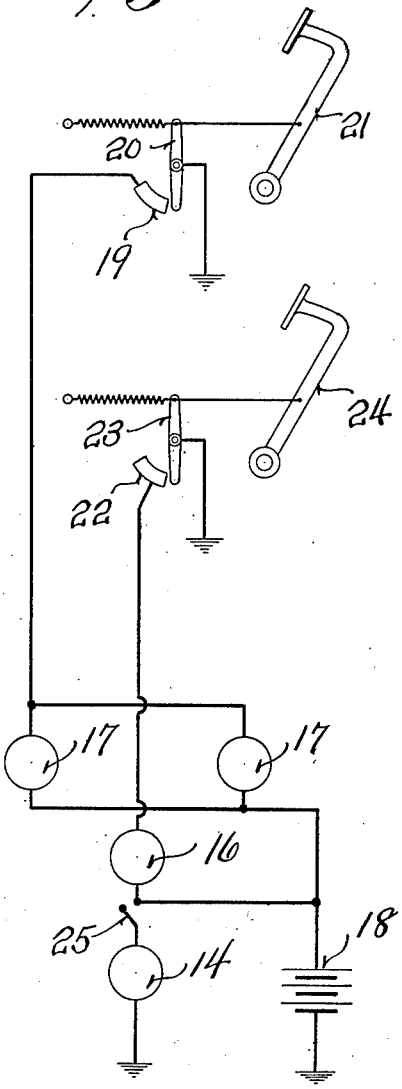
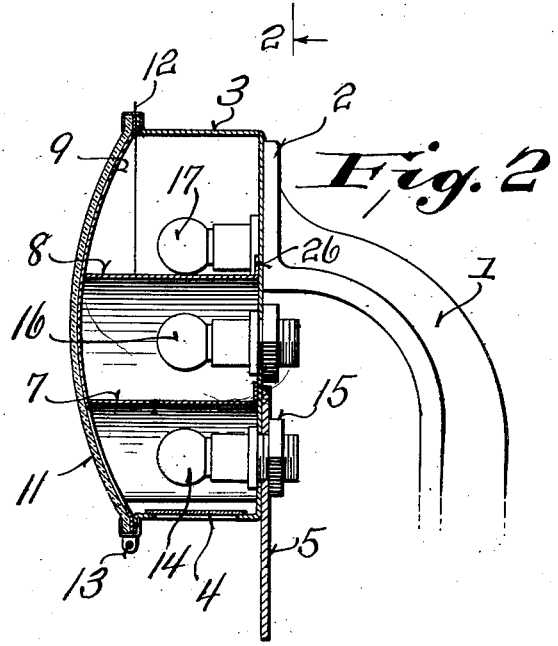
Inventor:
James M. Osgian
By
Attorneys Patented Feb. 16, 1926.

1,573,501

UNITED STATES PATENT OFFICE.

JAMES M. OSGIAN, OF RACINE, WISCONSIN.

AUTOMOBILE SIGNAL.

Application filed April 13, 1925. Serial No. 22,680.

*To all whom it may concern:*

Be it known that I, JAMES M. OSGIAN, a subject of Great Britain, and resident of Racine, in the county of Racine and State of Wisconsin, have invented certain new and useful Improvements in Automobile Signals; and I do hereby declare that the following is a full, clear, and exact description thereof.

This invention relates to automobile signals.

Objects of this invention are to provide an automobile signal which may be attached to an automobile, for instance, at the rear end, and which will give a warning signal for certain changes in the travel of the automobile, which will give a lookout signal when the operator manipulates the brake, and which is formed as a unitary member with the tail light.

Further objects are to provide an automobile signal which may be very compactly made, which is of attractive and pleasing appearance, and which may be readily assembled in a simple and easy manner.

An embodiment of the invention is shown in the accompanying drawings, in which:—

Figure 1 is a view of the signal with parts broken away.

Figure 2 is a vertical sectional view through the structure shown in Figure 1, such view corresponding to a section on the line 2—2 of Figure 1.

Figure 3 is a schematic view of the wiring.

The signal is carried by an arm 1 attached to a suitable portion of the automobile, for example, to the rear portion thereof. This arm is provided with an upstanding portion 2 which is directly attached to the casing 3 of the signal. This casing 3 is cylindrical and has a cutaway lower portion covered by a transparent member 4. A hanger 5 is attached to the rear face of the casing 3 and is provided with outwardly projecting apertured arms 6 which are adapted to receive the license plate and to thus hold the license plate below the transparent portion 4.

The inner portion of the casing 3 carries a pair of eccentrically arranged small partitions 7 and 8, the small partitions being open at their lower side above the transparent member 4. An opaque plate 9, preferably of spherical contour, is positioned immediately in front of the casing 3, and has letters such as indicated at 10 cut therethrough. A cover plate 11, preferably of colored glass, is positioned outside of the plate 9 and is retained in position by means of a flanged border strip 12 clamped together by means of the screw or bolt 13, as shown in Figure 1.

It is to be noted that the cutout letters are formed in a crescent or curved order, the upper letters forming the words "Lookout" and the lower letters forming the word "Stop".

These letters or cutaway portions are positioned, as shown in Figure 1, and are adapted to be independently illuminated.

A tail light 14 is positioned within the smallest partition 7 and it is to be noted that the nut 15 of its socket or holder, also clamps the hanger 5 in position, as shown in Figure 2. A second electric lamp 16 is positioned within the partition 8, and preferably a pair of electric lamps are positioned in the main casing outside of the casing 8.

The preferred form of wiring is such as to permit the control of the tail light by an auxiliary switch and the control of the stop and the lookout signal by means of the brake and clutch pedals respectively.

As shown in Figure 3, the battery 18 has one side grounded and the other side connected through the lamps 17 to a stationary contact 19, such contact being adapted for engagement by the movable switch member 20. This switch member is grounded and is controlled from the clutch pedal 21. The battery is also connected to the lamp 16 and from thence to the stationary contact 22. This contact is adapted for engagement by the movable switch arm 23, such switch arm being grounded and controlled by the brake pedal 24. An auxiliary manually controlled switch 25 is provided for the tail light 14, it being noted that the opposite side of this lamp is also grounded.

In operation, it is apparent that when the brake-pedal is depressed to alter the speed of the car that a warning signal "Lookout" is given in an automatic manner. Further, when the clutch pedal is set, the "Stop" signal is illuminated. Obviously the tail light may be turned on or off as required by means of the manually controlled switch 25.

It is to be particularly noted that the construction of the signal is such that a very simple type of casing may be employed, For example a single continuous member may be used for forming the partitions 7 and 8, as shown in Figure 1, and such member may be provided with outwardly turned lips 26, secured to the inner side of the base 2 or rear portion of the main casing. The partitions 7 and 8 together form a crescent-shaped member whose arms surround the upper part and the sides of the tail light. This materially simplifies the construction of the casing and also attains a marked degree of compactness, and thus provides a very attractive and relatively small signal device.

It will be seen, therefore, that an automobile signal has been provided which may be cheaply manufactured, which is of pleasing and attractive appearance, and which is of simple and substantial construction.

Attention is directed to the fact that the bulbs 17 are so positioned close to the deflector 8 that they will illuminate the "lookout" sign without causing a glare at any one place, due to the fact that these two bulbs are spaced clear of any of the transparent letters.

I claim:

An automobile signal comprising a cylindrical casing having a cutaway lower portion, a transparent member covering such lower portion, a tail light located above such cutaway portion, a small cylindrical partition having an open lower portion and positioned around said tail light and within said casing, an intermediate partition positioned within said casing and surrounding said small partition and having an open lower portion, a lamp located within the portions of said casing external to and enclosed by said intermediate partition, and a legend bearing cover plate for said main casing, said small partition and said intermediate partition having their lower ends joined and together forming a crescent-shaped member whose arms surround the sides and upper part of the tail light.

In testimony that I claim the foregoing I have hereunto set my hand at Milwaukee, in the county of Milwaukee and State of Wisconsin.

JAMES M. OSGIAN.